T. C. JOHNSON.
BOX MAGAZINE FOR FIREARMS.
APPLICATION FILED OCT. 10, 1919.
1,331,155.
Patented Feb. 17, 1920.
2 SHEETS—SHEET 1.
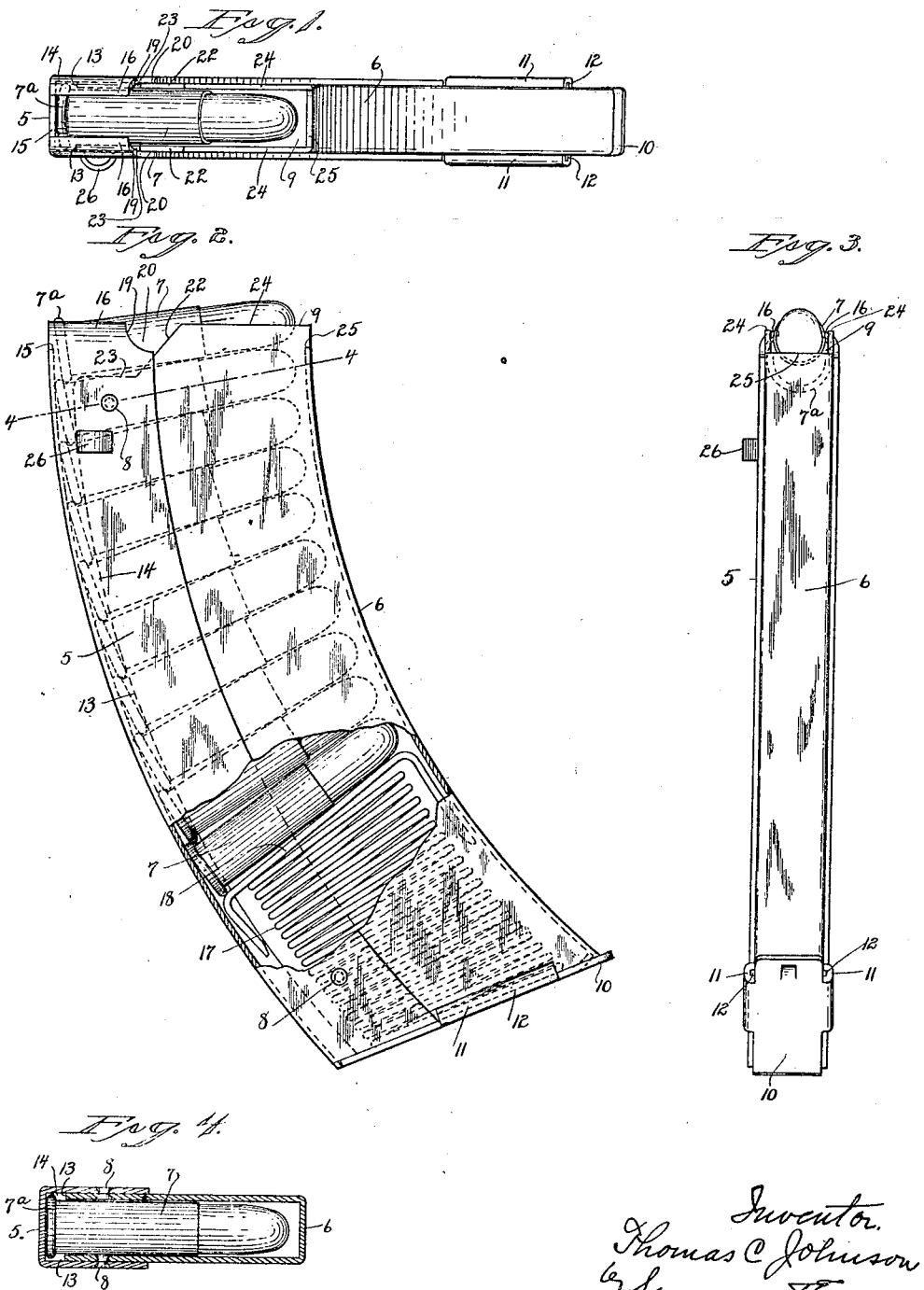

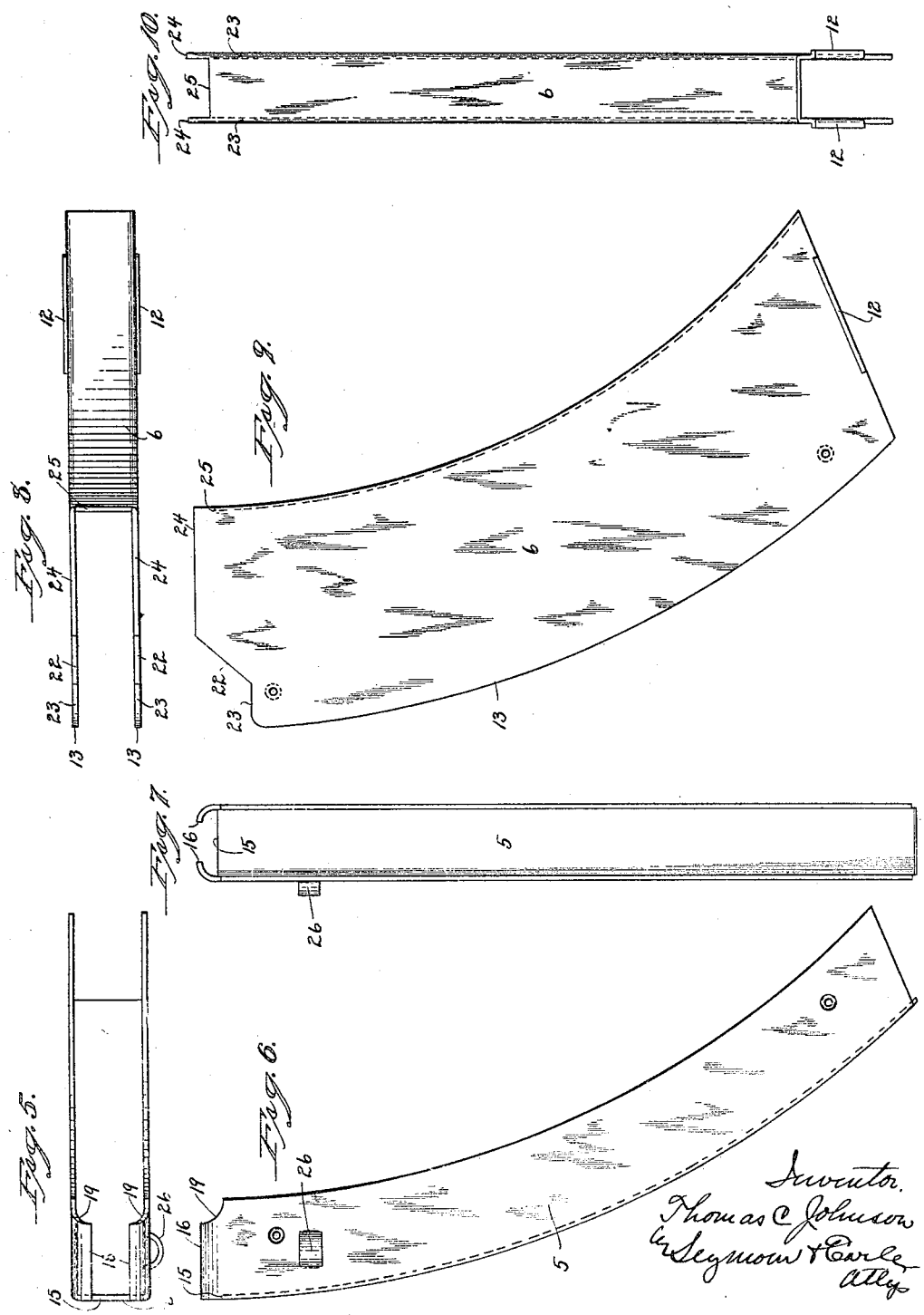

UNITED STATES PATENT OFFICE.

THOMAS C. JOHNSON, OF NEW HAVEN, CONNECTICUT, ASSIGNOR TO WINCHESTER REPEATING ARMS CO., OF NEW HAVEN, CONNECTICUT, A CORPORATION.

BOX-MAGAZINE FOR FIREARMS.

1,331,155.   Specification of Letters Patent.   Patented Feb. 17, 1920.

Application filed October 10, 1919. Serial No. 329,783.

*To all whom it may concern:*

Be it known that I, THOMAS C. JOHNSON, a citizen of the United States, residing at New Haven, in the county of New Haven and State of Connecticut, have invented a new and useful Improvement in Box-Magazines for Firearms; and I do hereby declare the following, when taken in connection with the accompanying drawings and the characters of reference marked thereon, to be a full, clear, and exact description of the same, and which said drawings constitute part of this application, and represent, in—

Figure 1—a plan view of one form which a box-magazine embodying my invention may assume, shown as charged.

Fig. 2—a view thereof, partly in right-hand side elevation and partly in vertical central sections.

Fig. 3—a front view thereof.

Fig. 4—a view thereof in transverse section on the line 4—4 of Fig. 2.

Fig. 5—a detached plan view of the rear of the segmental, rear, trough-like member.

Fig. 6—a view thereof in side elevation.

Fig. 7—a front view thereof.

Fig. 8—a detached plan view of the front trough-like member.

Fig. 9—a view thereof in side elevation.

Fig. 10—a front view thereof.

My invention relates to an improved box-magazine for firearms, and more particularly to that class of box-magazines which are segmental in form and designed to receive a single column of rim cartridges, the object being to produce a simple, cheap and reliable box-magazine of the type and character described.

With these ends in view my invention consists in a segmental box-magazine for firearms, having front and rear segmental trough-like members telescoped one within the other and secured together. My invention further consists in a segmental box-magazine for firearms, having certain details of construction as will be hereinafter described and pointed out in the claims.

In carrying out my invention I produce from sheet-metal in suitable dies, a trough-like segmental rear member 5 and a segmental trough-shaped front member 6, both members being alike in curvature and substantially alike in length, but the front member being deeper than the rear member and sufficiently narrower than the same to be telescoped with a tight fit thereinto, whereby a segmental box-magazine having concentric front and rear walls curved throughout their length is produced with its side walls in the spaced relation required for confining between them a single vertical column of rim cartridges 7. When the front member 6 has been positioned within the rear member 5 as described, the two members are secured together by rivets 8 passed through their side walls, or in any other suitable manner, as by brazing, soldering or welding.

At its upper end the magazine is formed with an open mouth 9, while its lower end is closed by a bottom plate 10, formed upon its side edges with oppositely located upwardly and inwardly turned flanges 11, receiving correspondingly located outwardly turned flanges 12, formed at the lower ends of the side walls of the front member 6. I do not, however, limit myself to any one way of constructing and assembling the bottom plate 10, as obviously that may be done in a variety of ways.

The rear and front segmental members 5 and 6 are proportioned in depth so that when the latter is telescoped into the former its curved rear edges 13 (Fig. 4), form the forward walls of cartridge-head-receiving channels 14 in which the rims 7ª of the cartridges 7 are confined, the said channels 14 also being concentric with the front and rear walls of the completed structure.

The upper end of the rear wall of the rear member 5 is cut away as at 15 to form a clearance-opening for the entrance of the bolt which moves back and forth over the top of the magazine when same is in position in the arm, while the upper ends of the side walls of the said rear member are bent inwardly to form the cartridge-retaining flanges 16 which prevent the head ends of the cartridges from being prematurely lifted out of the magazine under the influence of the follower-spring 17, which is located in the bottom of the box-magazine and acts upon the follower 18, which may be of any approved construction and arrangement, and upon which the lowermost cartridge of the column rests.

The forward edges of the cartridge-retaining flanges 16 are cut away as at 19 to form the rear walls of vertical feeding-and-loading notches 20, the forwardly and upwardly inclined forward walls of which are produced by the upper ends of the forward walls of obtuse-angled cuts 22 formed in the upper rear corners of the side walls of the front member 6. The vertical feeding-and-loading notches 20 (Fig. 2), thus produced lie directly in front of the forward edges of the cartridge retaining flanges 16 aforesaid, and provide for the feeding of the cartridges one by one out of the magazine as well as for loading the cartridges one by one into the magazine. In loading the cartridges into the magazine their rims are hooked under the forward edges of the flanges 16, after which the cartridges are pushed back under the same, while their forward ends are crowded down into the mouth 9 thereof.

The obtuse-angled cuts 22 in the upper rear corners of the front member 5 are made sufficiently deep so that the uppermost cartridge of the column of cartridges in the magazine, is free to be pushed forward by the bolt when the same engages with the head of the cartridge on its entrance into the clearance-opening 15 at the upper end of the rear member 5 of the magazine. As the cartridge is pushed forward by the bolt, its rim rides upon the horizontal lower edges 23 of the said cuts 22 until it reaches the lower ends of the upwardly and forwardly inclined walls of the said cuts, the upper portions of the said walls forming, as described, the forward walls of the feeding-and-loading notches 20. As the rim of the cartridge engages with the said walls, the head of the cartridge is gradually lifted in the said notches while at the same time the body of the cartridge is lifted out of the forward end of the magazine mouth 9, the upper edges 24 of the side walls of the front member 6 here forming an opening narrower than the diameter of the rim of the cartridge. The cartridge is thus lifted out of the magazine mouth 9 and pushed forward by the bolt which moves through a clearance-opening 25 (Fig. 10) at the upper end of the front wall of the front member 6.

For positioning the magazine in the receiver of the arm, the right-hand wall of the rear member 5 is struck outward at its upper end to form a stop 26 which co-acts with a fixed portion of the arm to pre-determine the location of the magazine therein.

I claim:—

1. A removable box-magazine for firearms, having a trough-shaped, sheet-metal, front member and a trough-shaped, sheet-metal, rear member, the said members being adapted in form and size to be telescoped one within the other and the edges of one member being utilized as cartridge-head guides.

2. A removable box-magazine for firearms, having a trough-shaped, sheet-metal, front member and a trough-shaped, sheet-metal, rear member, the said members being adapted in form and size to be telescoped one within the other and the rear edges of the front member being utilized to form cartridge-head guides.

3. A segmental removable box-magazine for firearms, comprising segmental front and rear trough-shaped members, the side walls of the front member being telescoped within the side walls of the rear member and the rear edges of the side walls of the front member forming the forward walls of cartridge-head-receiving channels concentric with the front and rear walls of the magazine and adjacent to the rear wall thereof.

4. A segmental removable box-magazine for firearms, having front and rear trough-shaped members telescoped one within the other, and the adjacent upper corners of the side walls of the said members being cut away to form vertical feeding-and-loading notches.

5. A segmental removable box-magazine for firearms, having segmental trough-shaped front and rear members telescoped one within the other, the forward upper corners of the side walls of the rear member and the rear, upper corners of the side walls of the front member being cut away to form vertical feeding-and-loading notches, the cuts in the corners of the front member having the depth required to permit the uppermost cartridge to be fed forward in the magazine.

6. A segmental removable box-magazine for firearms, having segmental trough-shaped front and rear members telescoped one within the other, the rear upper corners of the walls of the said front member being cut away to form forwardly and upwardly directed cartridge head guides, the distance between the side walls of the said front member being less than the diameter of the head of a cartridge.

In testimony whereof, I have signed this specification in the presence of two subscribing witnesses.

THOMAS C. JOHNSON.

Witnesses:
DANIEL H. VEADER,
ERIK S. PALMER.